(12) United States Patent
Vilcauskas et al.

(10) Patent No.: US 8,589,240 B2
(45) Date of Patent: Nov. 19, 2013

(54) SYSTEM FOR SELLING PRODUCTS

(76) Inventors: Andy Vilcauskas, Tualatin, OR (US); Bryan Hunter, Portland, OR (US)

(*) Notice: Subject to any disclaimer, the term of this patent is extended or adjusted under 35 U.S.C. 154(b) by 380 days.

(21) Appl. No.: 11/599,095

(22) Filed: Nov. 14, 2006

(65) Prior Publication Data

US 2007/0226081 A1    Sep. 27, 2007

Related U.S. Application Data

(60) Provisional application No. 60/736,791, filed on Nov. 14, 2005.

(51) Int. Cl.
*G06Q 30/00* (2012.01)
(52) U.S. Cl.
USPC ............................. 705/26.1; 705/27.1
(58) Field of Classification Search
USPC ........................................... 705/26–27.2
See application file for complete search history.

(56) References Cited

U.S. PATENT DOCUMENTS

| | | | |
|---|---|---|---|
| 2003/0187753 A1* | 10/2003 | Takaoka | 705/26 |
| 2004/0128224 A1* | 7/2004 | Dabney et al. | 705/37 |
| 2006/0041500 A1* | 2/2006 | Diana et al. | 705/37 |
| 2006/0265259 A1* | 11/2006 | Diana et al. | 705/7 |

OTHER PUBLICATIONS

Business Editors/High, T. W. (Jan. 24, 2000). Digitalwork.com announces online sales tool to help small businesses grow. Business Wire. Retrieved from http://search.proquest.com/docview/445981600?accountid=14753.*

* cited by examiner

*Primary Examiner* — Resha Desai
(74) *Attorney, Agent, or Firm* — Chernoff Vilhauer McClung & Stenzel, LLP

(57) ABSTRACT

To aid potential purchasers in selecting products and services and to generate sales leads that may be sold to sellers, an Internet-based website is provided comprising products that are not available through the website's proprietor.

16 Claims, 5 Drawing Sheets

SYSTEM FOR SELLING PRODUCTS

CROSS-REFERENCE TO RELATED APPLICATIONS

This application claims the benefit of U.S. Provisional App. No. 60/736,791, filed Nov. 14, 2005.

BACKGROUND OF THE INVENTION

The present invention relates to a method and system for selling products.

Traditional retail automobile marketing involves placing large advertisements in the local newspapers. The advertisements typically show images of many of the vehicles available from the particular seller sponsoring the advertising. A price and a listing of standard and optional equipment is commonly displayed with the image of the vehicle. Readers of the newspaper, particularly those considering purchasing a vehicle, are drawn to advertisements in which a large selection of vehicles is presented in an appealing manner. Advertisements including an illustration representing an actual vehicle, typically together with its vehicle identification number (VIN), assist readers in selecting appropriate vehicles and in communicating their desires to a seller. If the reader finds a vehicle of interest, the reader is likely to visit the dealership sponsoring the advertisement to inspect the vehicle or otherwise contact the dealership for additional information concerning the vehicle. When the reader contacts the dealership, a salesperson has an opportunity to sell the advertised vehicle or another vehicle to the potential purchaser. Advertising is used this manner to generate interest in the products offered by the seller sponsoring the advertising and to facilitate contact between potential customers and the seller's sales personnel.

In addition to newspaper advertising, automotive dealerships commonly operate Internet based websites. These Internet websites commonly enable a potential customer to search the dealership's inventory for a particular type of vehicle, model and year of manufacture. After locating and selecting a vehicle from a written description of the inventory on the dealer's storage lot, the customer can, commonly, cause the website to display one or more pictures the specific vehicle, or an exemplary vehicle of the same model, and a description of the standard and optional equipment included on the vehicle. After viewing a website listing vehicles in the dealer's inventory, the potential customer can often purchase the vehicle through the website or otherwise make contact with the dealer's sales staff. When the potential customer contacts the dealership, a salesperson has the opportunity to sell the advertised vehicle or sell another vehicle to the potential purchaser. Internet websites are used in a manner similar to print advertising to generate interest in the products offered by the seller sponsoring the website and to facilitate contact between the seller's sales staff and potential purchasers.

Websites displaying a seller's inventory can be very useful to the potential consumer and to the seller. If a potential purchaser has identified a product of interest, he/she can determine if a product having the desired specifications and equipment is available locally. On the other hand, a seller, having a product in inventory matching the desired product or having many of the attributes desired by the potential purchaser, may be able to identify persons interested in purchasing and have an opportunity to sell this product or another product if the potential purchaser is drawn to visit the seller's business by the knowledge that a product closely matching the purchaser's desired product is available. However, a potential purchaser who has not identified a specific product of interest typically must explore a number of websites to review products and features available from competing manufacturers and, after identifying a particular product of interest, contact one or more websites operated by local dealers to search the dealers' inventories for a product having at least some of the desired specifications. What is desired, therefore, is an Internet based website to aid potential purchasers in identifying a product(s) of interest and aid sellers of products in identifying persons interested in purchasing the type of products offered by the seller.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
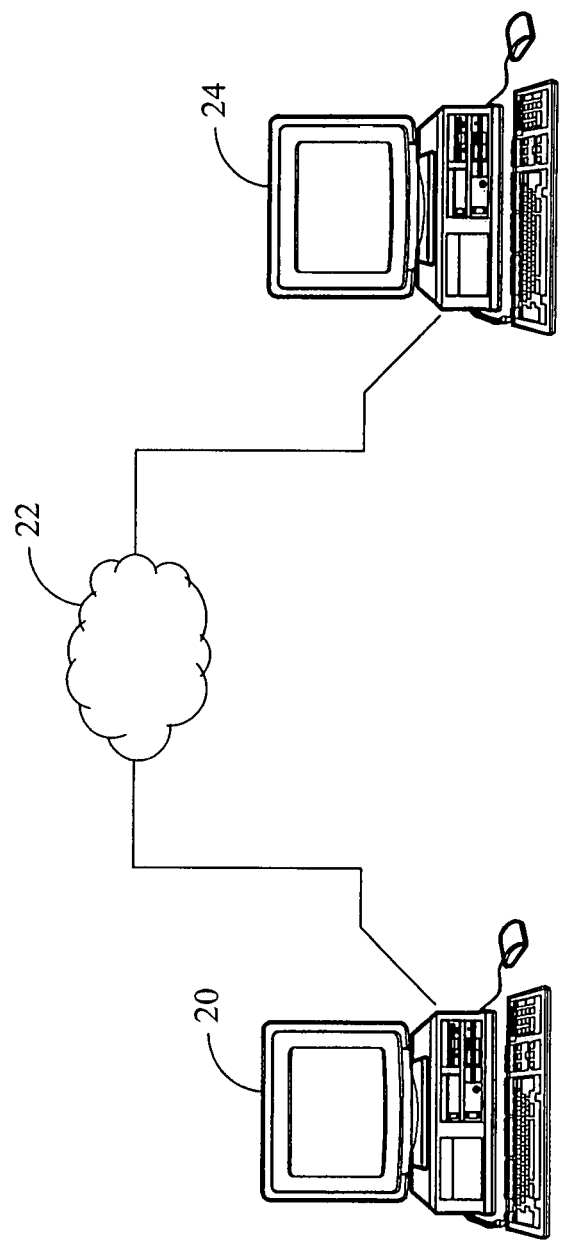
FIG. 1 is schematic illustration of a computer network useful for displaying a web site.

Referring in detail to the drawings where similar items are identified by like reference numerals, and, more particularly to FIG. 1, a website is typically hosted on a computer server 20 interconnected to a network 22, such as the Internet, that may include a plurality of interconnected computers. A computer user uses an interface, such as an Internet or web browser program, installed on a computer 24 that is connected to the network to establish a connection with the server and view the content available at websites that are hosted on the server. A website hosted on a computer server 20 and accessible over the network 22 may be used to introduce potential consumers to products or services that are available for purchase, lease, rental, license or acquisition in any other manner. The website may be related to any type of product or service and may include any type of content, including text, video and audio, that is presentable over a computer network.

Figure 2:
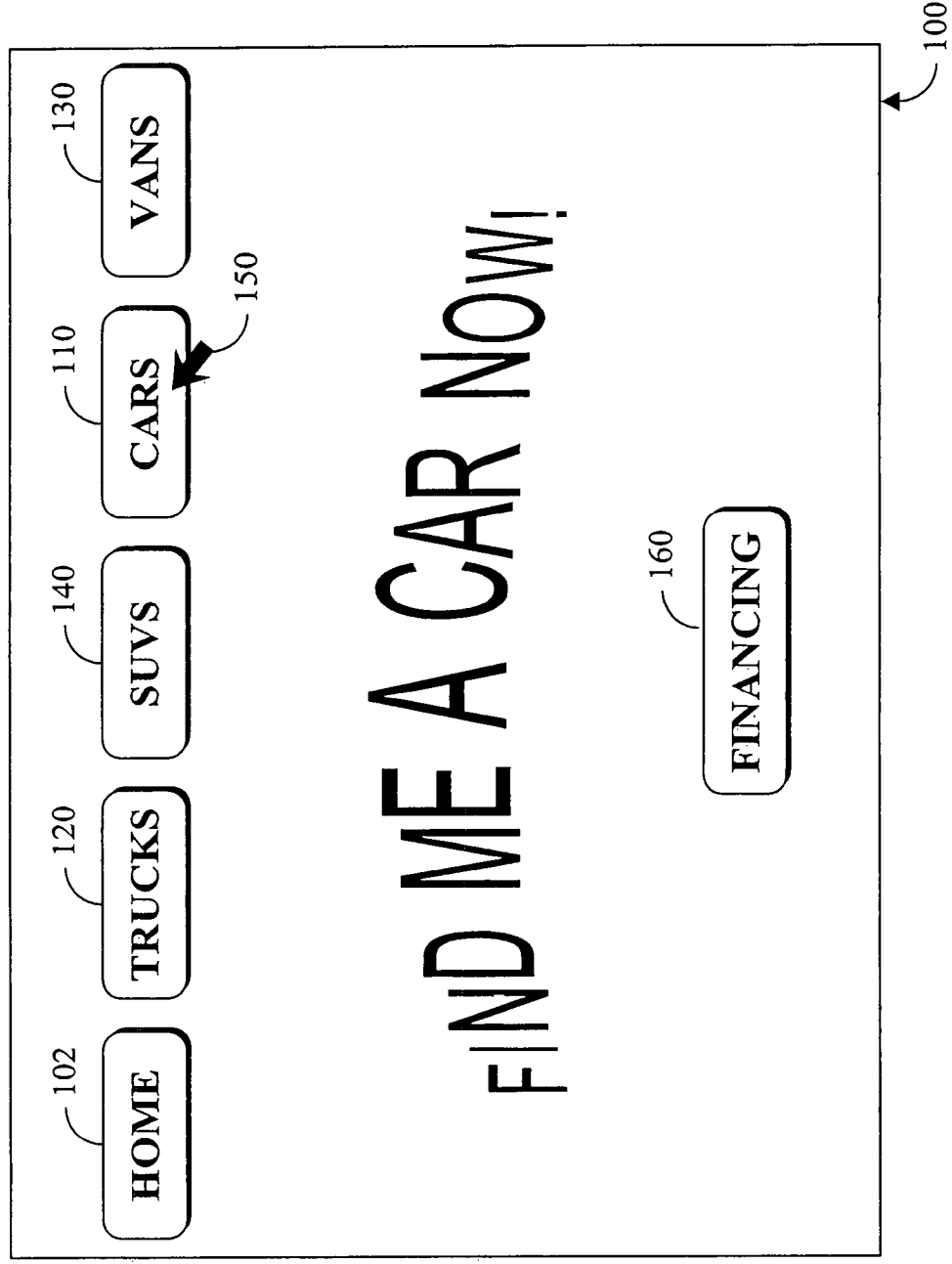
FIG. 2 is an illustration of an introductory page for an exemplary product sales web site.

An Internet based website may, for example, include content to assist potential consumers in identifying a vehicle of interest and determining a particular set of desired specifications for the vehicle. In addition, the website may include content enabling the generation of sales leads for the website's proprietor or for other sellers having an affiliation with the website's proprietor. Referring to FIG. 2, when a potential consumer connects to the website, an introductory or home web page 100 is displayed that introduces options useful for the user in identifying a vehicle of interest. Preferably, the user is presented with the ability to select among a plurality of different principal type of vehicles. By selecting a type of vehicle the user can avoid sifting through material that is not related to a type of vehicle that is of interest to the potential purchaser. Preferably a vehicle type can be selected without using a pull down window, which can be troublesome to navigate. For example, a type of vehicle including cars 110, trucks 120, vans 130, and suvs 140 (sports utility vehicles) can be selected by using the computer's keys, mouse or other pointing device to co-locate the computer's cursor 150 and the button appropriate for the type of vehicle of interest to the user. Actuating a control of the computer selects the chosen button and activates a link to another page of the website related to the specific type of vehicle. A home button 102 may also be included to bring the user back to the initial webpage. Other information related to the commercial transactions underlying the website, such as financial information, may also be accessible by activating a link 160 on the web page.

Figure 3:
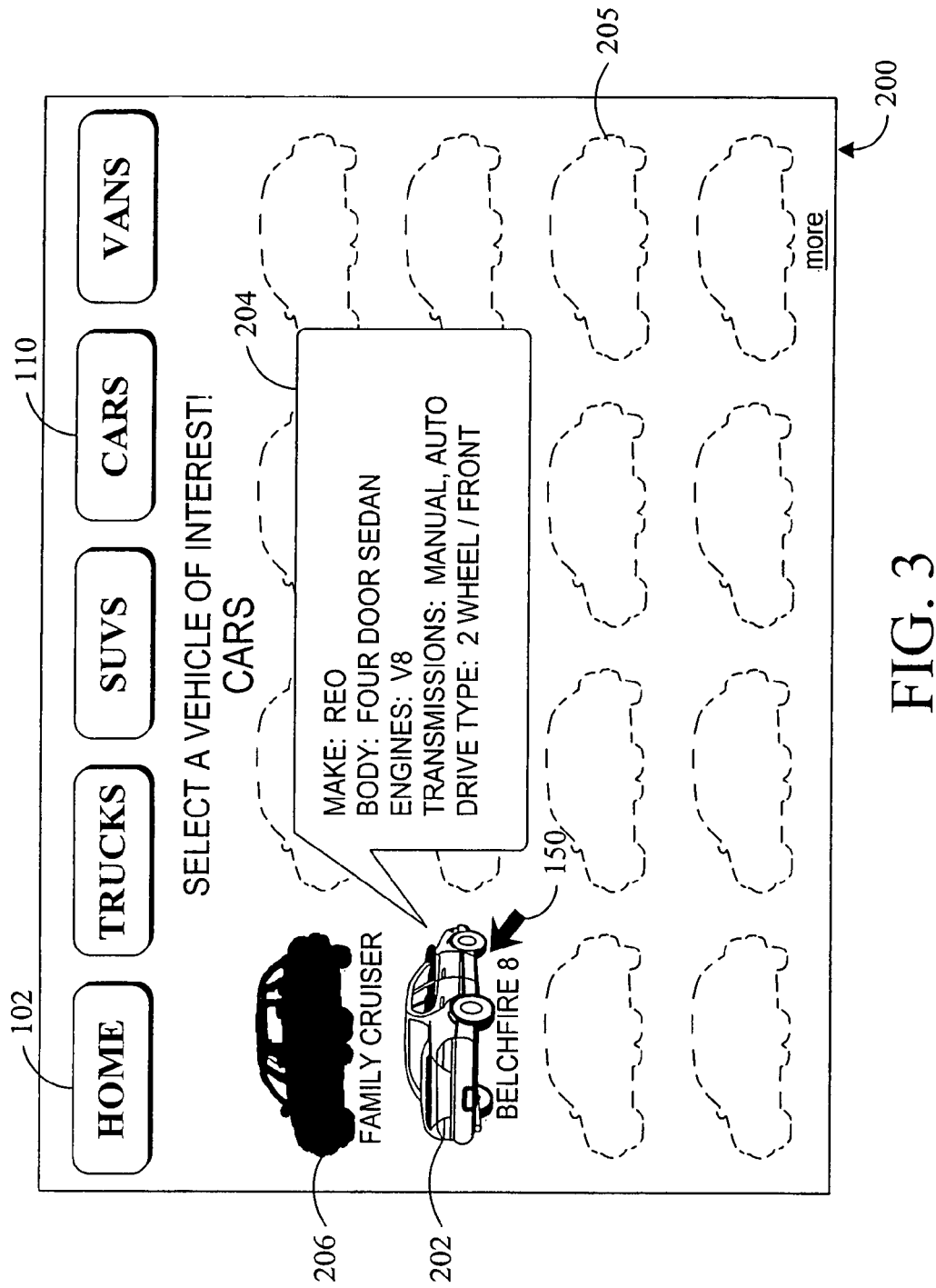
FIG. 3 is an illustration of a product selection page for an exemplary product sales web site.

Referring to FIG. 3, based upon the user's selection of a type of vehicle of interest, such as cars 110, the user is presented with a plurality of vehicles of the type selected. Typically, an image 205, preferably, a photograph, of each of a plurality of vehicles or an image of an exemplary vehicle of a particular make and model is presented to the user. To further assist the user in finding a vehicle of interest, the vehicle selection web page 200 may also include pop-up windows 204 containing a summary of each vehicle's features. By co-locating the cursor 150 and the image of a vehicle, for example, image 202, a window containing a summary of the vehicle's features may be displayed within the currently displayed web page enabling the user to preview the vehicle's equipment and other features. The pop-up window 204 assists the user in deciding whether to further investigate the vehicle without requiring that another page of the website be transmitted from the server and displayed.

Figure 4:
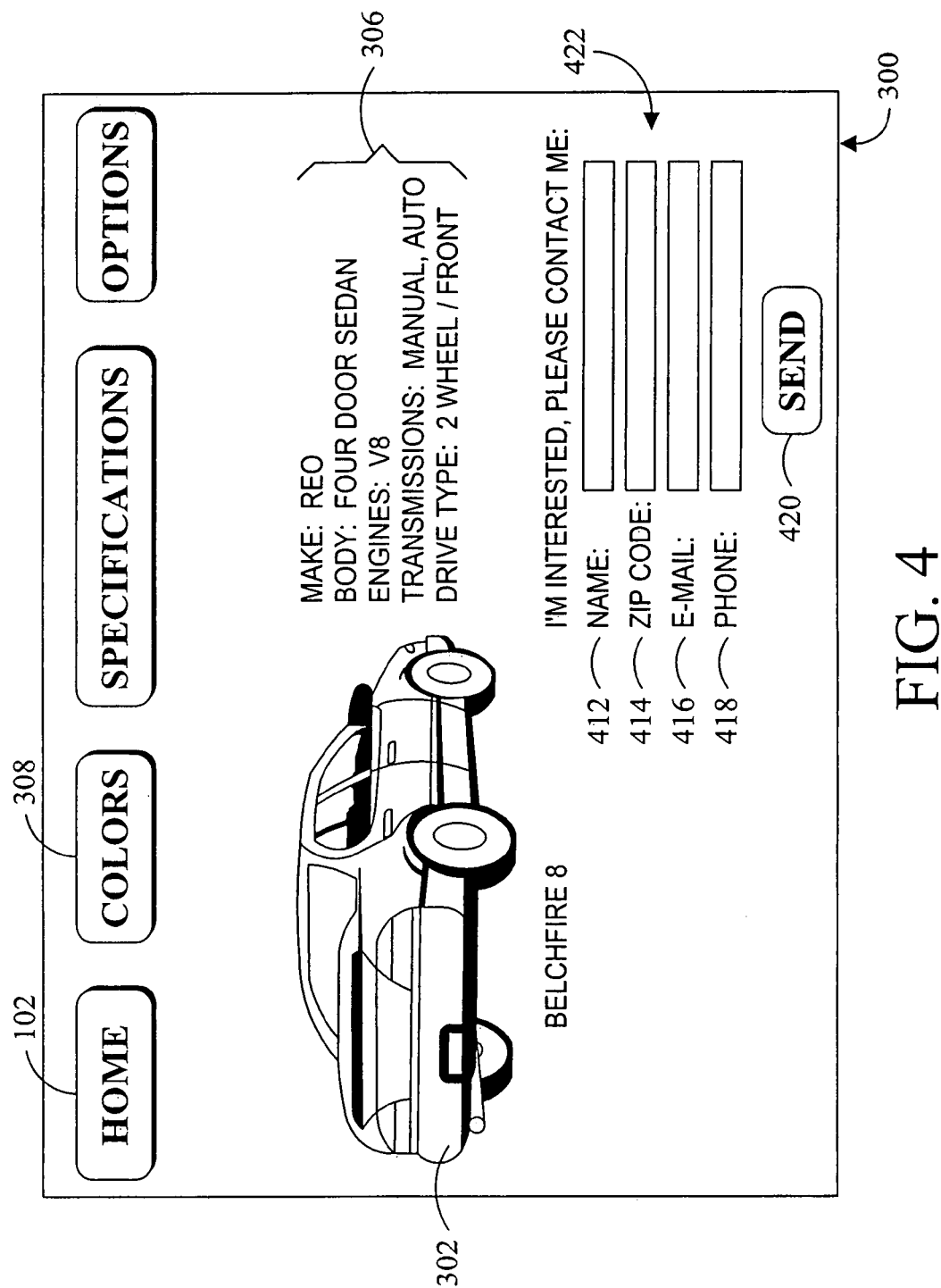
FIG. 4 is an illustration of a product description page for the exemplary product sales web site.

When the user selects an image of a vehicle of interest from the vehicles displayed on the vehicle selection page 200, the vehicle is preferably presented in greater detail. Referring to FIG. 4, by selecting an image of a vehicle 202 on the vehicle selection page, a user activates a link to a vehicle specific page 300 of the website that includes an enlarged view of the vehicle 302 together with a listing of a number of features of the vehicle 306 (indicated by a bracket). These features may include many of the principal characteristics of the vehicle, such as, for example, (1) type of vehicle, (2) brand of vehicle, (3) model, (4) drive configuration (2 wheel-drive (front, rear) or 4 wheel-drive), (5) color(s) of the vehicle, (6) body style, (7) number of seats (8) available engine(s), (10) fuel and (9) available transmission(s).

Figure 5:
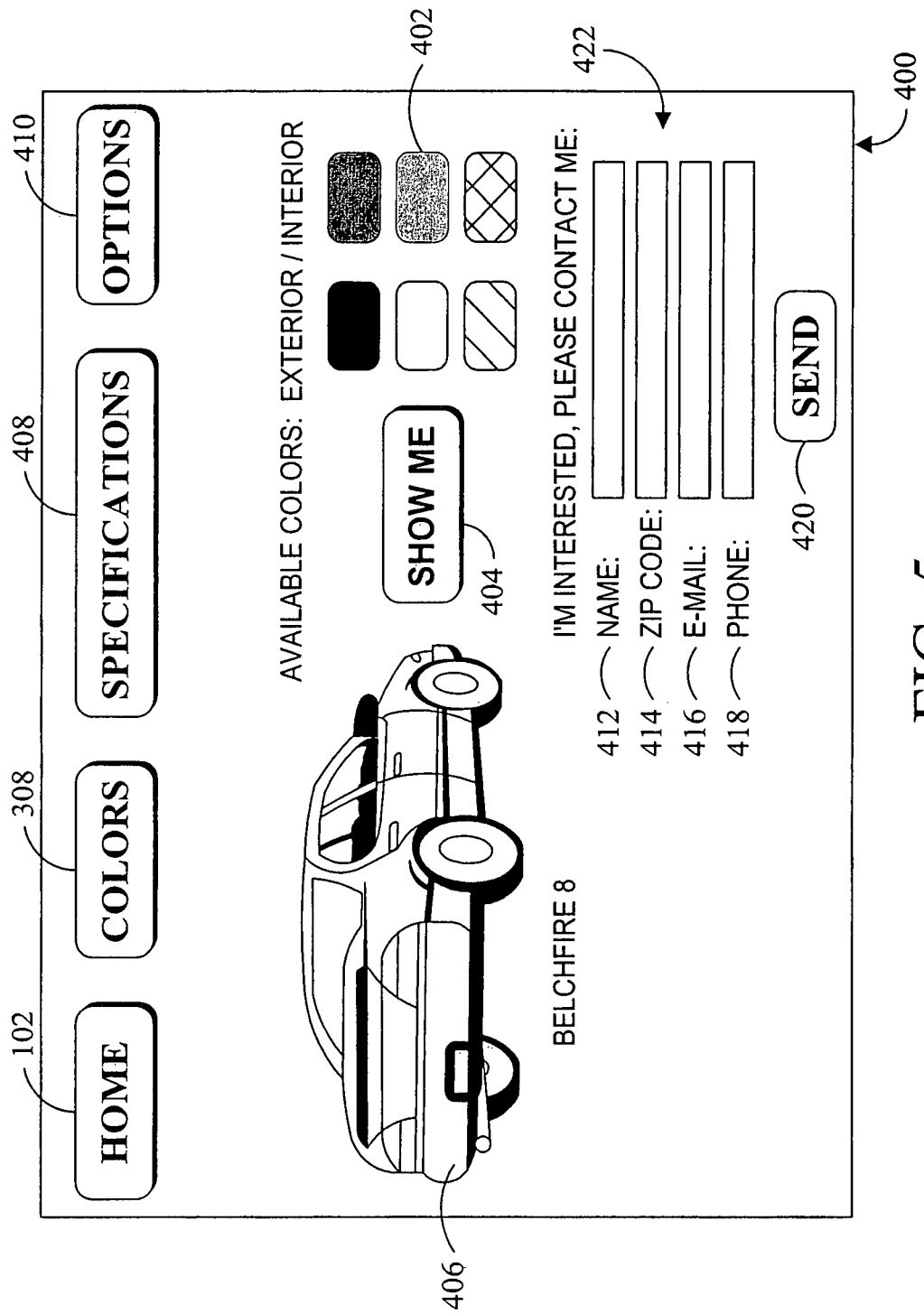
FIG. 5 is an illustration of a vehicle color page for the exemplary product sales web site.

Links to additional content may be provided to enable the potential purchaser to further investigate a vehicle of interest. Referring to FIG. 5, the exemplary vehicle specific page 300 includes, for example, a color button 308 enabling the user to activate a link to a page 400 displaying the colors 402 available for a new vehicle. The page may also include content, such as a paint button 404, enabling display of an image 406 of the selected vehicle in the color(s) selected by the user. Additional links, activated, for example, by selecting a button, may enable display of pages that list the additional specifications 408 of the selected vehicle and the major options 410 available for the vehicle. After the user has selected one of the vehicles displayed on the vehicle selection page or has further refined the specifications of a selected vehicle by selecting a color and desired optional equipment, the customer may elect to receive additional information about available vehicles by providing contact information 422. Typically, the user may enter a name 412, zip code 414, e-mail address 416, and phone number 418 and other information to enable contact by the website's proprietor. After entering the appropriate information the user may activate a "send" button 420 to transmit the contact information to the website's proprietor. The website may also include a checkout system through which the user can purchase a selected vehicle.

A web site would normally present vehicles which are available for purchase from the proprietor of the website or otherwise available through a partner of the website's proprietor. However, there is also a high likelihood that the vehicles included in a single dealership's inventory or even the inventory of a plurality of dealers and presented to the customer on the website will not include a vehicle of interest to the potential purchaser. In order to increase the likelihood that the potential purchaser will find a vehicle of interest, the present inventors came to the realization that the website should present vehicles that are in fact not actually available from website's sponsor or even other partner sellers. It is highly counterintuitive to present vehicles which are in fact not available through the website's proprietor in order to attempt to other sell vehicles which are available. However, if a potential purchaser contacts the website's proprietor to inquire about a vehicle that is included in the website, there is a good probability that the seller can sell a similar vehicle or even a different vehicle to the potential customer, even though the vehicle desired by the potential purchaser is unavailable through the website's proprietor. Moreover, a sales lead generated by the website has a value to some seller because it can represents a potential purchaser's interest in a product and a high likelihood of a sale by a seller that has available the particular product or service of interest or a similar product or service. If a vehicle is available through the website's proprietor, a price for the vehicle may be included in the website but if a vehicle is not available through the proprietor of the website, typically, the material displayed on the website would not include a price and may disclaim availability to avoid any confusion about whether the product is being offered for sale by the website's proprietor.

Accordingly, a sales lead has value to the website's proprietor even if the proprietor does not sell the product that is selected by the potential purchaser. Beyond the possibility of selling a different product to the website's user, sales leads generated by the website may be sold to other sellers that deal in the type of product or the specific product of interest to the potential purchaser. The same sales lead may be provided to a plurality of sellers, each of which makes a payment for the sales lead. In this manner, the sales lead may be sold multiple times to increase the return of the website's proprietor. Likewise, sales lead may be auctioned off to one or more of the highest bidders for the lead. This provides the ability to maximize the return for the website by obtaining a market price for the sales leads. For example, at a particular time, a dealership may require additional sales leads to meet a sales quota or otherwise and may be willing to pay a higher price for a lead.

The value of a sales lead may also depend upon the product selection made by potential purchaser during interaction with the website. For example, a potential purchaser's selection of a higher priced vehicle may make the lead more valuable. Likewise, a purchaser's interest in a particular vehicle with specific features will further qualify the lead and increase the probability that a targeted sales effort will lead to a sale, increasing the value of the sales lead.

Since the availability of specific vehicles may tend to increase or decrease the number of leads and the type of leads that are generated and since the vehicles shown are not actually available through the website's proprietor, the website may tailor vehicles descriptions presented in order to increase the likelihood of obtaining sales leads. In addition, depending on the particular needs of the selling dealers, the vehicles that are presented and/or the order in which the vehicles are presented may be modified in order to increase the likelihood that the customer may select a particular vehicle.

To aid a potential purchaser in selecting a product and to generate sales leads that may be sold to others, the sales system provides an Internet-based website comprising products that are not available through the website's proprietor.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention. All the references cited herein are incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method of selling a product using a computer system comprising communicatively connected plural computers, the method comprising the steps of:
    (a) storing a description of each of a plurality of physical products in an electronic storage accessible by a first computer;
    (b) with said first computer recovering at least one product description from said electronic storage including at least one description of a product not currently available through a provider of the product description and which will not be available through said provider of said product description from a product supplier, and which will not be available through a seller partnering with said provider in advance of said recovery of said description of said at least one unavailable product;
    (c) transmitting said product description of said unavailable product to a second computer for presentation to a potential purchaser of said product;
    (d) enabling said potential purchaser to select said unavailable product when said product description of said unavailable product has been presented with said second computer; and
    (e) transmitting an identity of said potential purchaser from said second computer when said unavailable product is selected by said potential purchaser, said identity of said potential purchaser transmitted to one of a seller of a product matching said unavailable product and a seller of a product similar to said unavailable product.

2. The method of selling a product of claim 1 wherein the step of transmitting an identity of said potential purchaser to one of a seller of a product matching said unavailable product and a seller of a product similar to said unavailable product selected by said potential purchaser comprises the steps of:
    (a) notifying at least one of a seller of a matching product and a seller of a similar product of the availability of said identity of said potential purchaser;
    (b) accepting a bid from at least one of a seller of a matching product and a seller of a similar product for said identity of said potential purchaser; and
    (c) transmitting said identity to at least one high bidder.

3. The method of selling a product of claim 1 wherein the product is a vehicle.

4. The method of selling a product of claim 3 further comprising the steps of:
    (a) announcing the availability of an identity of a potential vehicle purchaser; and
    (b) accepting a bid from a potential vehicle seller for said identity of said potential purchaser.

5. The method of selling a product of claim 3 further comprising the steps of:
    (a) identifying at least one seller of vehicles of a type selected by said potential purchaser; and
    (b) transmitting said identity of said potential purchaser to a subscribing seller of products similar to a vehicle selected by said potential purchaser.

6. The method of selling a product of claim 3 further comprising the steps of:
    (a) identifying a value of a particular vehicle selected by said potential purchaser;
    (b) requesting a price for transmitting said identity of said potential purchaser, an amount of said price based on said value of said selected vehicle; and
    (c) transmitting said identity of said potential purchaser to a seller of vehicles upon receipt of said price.

7. The method of claim 1 wherein said product description comprise an image in a computer-processible format.

8. The method of claim 1 wherein one of a seller of a product matching said unavailable product and a seller of a product similar to said unavailable product is an external product supplier.

9. The method of claim 1 wherein one of a seller of a product matching said unavailable product and a seller of a product similar to said unavailable product is a partner of said provider of said product description.

10. The method of claim 1 wherein one of a seller of a product matching said unavailable product and a seller of a product similar to said unavailable product is a vehicle dealer.

11. The method of claim 1 wherein one of a seller of a product matching said unavailable product and a seller of a product similar to said unavailable product is an established supplier of products to said provider of said product description.

12. The method of claim 11 wherein said established product supplier is an entity other than said provider of said product description.

13. The method of claim 12 wherein said provider of said product description has at least one predetermined established product supplier.

14. The method of claim 13 wherein said predetermined product supplier is a business partner of said provider of said product description.

15. The method of claim 1 wherein said provider of said product description shares inventory or referrals with one or more participating partners each acting as one of a seller of a product matching said unavailable product and a seller of a product similar to said unavailable product.

16. A computer system for selling a vehicle comprising:
    (a) a computer interconnected to a computer network and configured to display at least one of text, video and audio content transmissible on said network and configured to transmit an identity of a user of said computer; and
    (b) a server interconnected to said network, said server configured to receive said identity of said user of said computer and to transmit at least one of text, video and audio content over said network to said computer for display by said computer, said content including a description of a vehicle not available from at least one of a supplier of said content, a supplier of said vehicle to said supplier of said content, and a seller partnering with said content supplier to sell said vehicle in advance of said transmitting of said description of said vehicle; said server configured to transmit said identity of said user of said computer to another computer of a potential seller of said unavailable vehicle when a description of said unavailable vehicle has been transmitted to said computer and said unavailable vehicle has been selected by said user.

* * * * *